United States Patent
Nakagata et al.

(10) Patent No.: US 8,582,900 B2
(45) Date of Patent: Nov. 12, 2013

(54) DIGITAL WATERMARK EMBEDDING DEVICE, COMPUTER-READABLE RECORDING MEDIUM, AND DIGITAL WATERMARK DETECTING DEVICE AND COMPUTER-READABLE RECORDING MEDIUM

(75) Inventors: Shohei Nakagata, Kawasaki (JP); Kensuke Kuraki, Kawasaki (JP); Jun Takahashi, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 177 days.

(21) Appl. No.: 13/296,976

(22) Filed: Nov. 15, 2011

(65) Prior Publication Data
US 2012/0163583 A1 Jun. 28, 2012

(30) Foreign Application Priority Data
Dec. 28, 2010 (JP) ................. 2010-294032

(51) Int. Cl.
*G06K 9/36* (2006.01)
(52) U.S. Cl.
USPC ............ 382/232; 380/268; 380/54; 382/100; 704/500; 704/502; 713/176; 714/746; 726/1
(58) Field of Classification Search
None
See application file for complete search history.

(56) References Cited

U.S. PATENT DOCUMENTS

| | | | | |
|---|---|---|---|---|
| 5,915,027 | A * | 6/1999 | Cox et al. ........................ | 380/54 |
| 6,792,542 | B1 * | 9/2004 | Lee et al. ......................... | 726/1 |
| 6,829,710 | B1 * | 12/2004 | Venkatesan et al. .......... | 713/176 |
| 7,643,637 | B2 * | 1/2010 | Venkatesan et al. .......... | 380/268 |
| 7,739,511 | B2 * | 6/2010 | Horne et al. ................... | 713/176 |
| 7,957,977 | B2 * | 6/2011 | Zhao et al. ..................... | 704/500 |
| 2004/0153941 | A1 * | 8/2004 | Muratani ....................... | 714/746 |
| 2005/0175180 | A1 * | 8/2005 | Venkatesan et al. .......... | 380/268 |
| 2006/0045309 | A1 * | 3/2006 | Suthaharan ................... | 382/100 |
| 2008/0027734 | A1 * | 1/2008 | Zhao et al. ..................... | 704/502 |

FOREIGN PATENT DOCUMENTS

| | | |
|---|---|---|
| JP | 2007-178857 A | 7/2007 |
| JP | 2007-324720 A | 12/2007 |

OTHER PUBLICATIONS

D., Boneh et al., "Collusion-Secure Fingerprinting for Digital Data", IEEE Transactions on Information Theory, vol. 44, No. 5, Sep. 1, 1998, pp. 1897-1905.
G., Tardos et al., "Optimal Probabilistic Fingerprint Codes", in STOC '03, ACM (2003), Jun. 9, 2003, pp. 116-125.

* cited by examiner

*Primary Examiner* — Tsung-Yin Tsai
(74) *Attorney, Agent, or Firm* — Fujitsu Patent Center

(57) ABSTRACT

An digital watermark embedding device including an interface unit configured to acquire content in a digital form and digital watermark information, the device includes, a codeword generating unit configured to generate a base codeword including a bit sequence including the digital watermark information; a shifting unit configured to generate a plurality of correcting codewords differing from one another by permutating an arrangement in the bit sequence included in the base codeword depending on a plurality of shift amounts, the plurality of shift amounts differing from one digital watermark information to another, under a predetermined permutation rule; and a watermark superimposing unit configured to embed the plurality of correcting codewords in the content.

7 Claims, 14 Drawing Sheets

DIGITAL WATERMARK EMBEDDING DEVICE, COMPUTER-READABLE RECORDING MEDIUM, AND DIGITAL WATERMARK DETECTING DEVICE AND COMPUTER-READABLE RECORDING MEDIUM

CROSS-REFERENCE TO RELATED APPLICATION

This application is based upon and claims the benefit of priority of prior Japanese Patent Application No. 2010-294032, filed on Dec. 28, 2010, the entire contents of which are incorporated herein by reference.

FIELD

The embodiments discussed herein relate to, for example, a digital watermark embedding device and a digital watermark embedding computer program that embed digital watermark information in a content in a digital form. The embodiments discussed herein also relate to, for example, a digital watermark detecting device and a digital watermark detecting computer program that detect digital watermark information embedded in a content in a digital form.

BACKGROUND

Recently, services for distributing contents in a digital form such as movies and music over the Internet or the like have been offered. Such contents are encrypted using a digital rights management (DRM) technology and then distributed. The DRM technology prohibits the contents from being illegally copied or distributed.

Unfortunately, incidents have occurred in which a viewer has illegally copied by photographing a picture content displayed on a computer display or a television monitor using filming equipment such as a camcorder, and has illegally distributed the copy of the picture content. Picture contents displayed on a display are not encrypted, and therefore it is difficult to prevent the picture contents copied by photographing from being distributed.

To address this, technologies of embedding in advance information, such as an identification number of a viewer, as a digital watermark in the content are being developed. Even if, for example, the picture content with a digital watermark embedded therein that is displayed on a display is photographed using a camcorder to be illegally copied, the digital watermark still remains in the copy of the picture content. After such a picture content illegally copied by capturing a picture in analog form has been distributed, it is possible to obtain the identification number of a viewer who has illegally used the picture content by detecting a digital watermark from the copy of the picture content. Accordingly, even in cases where the picture content is illegally copied by capturing a picture in analog form and is uploaded to a posting site or the like, the administrator of the picture content can specify where the picture content has come from, from information embedded in the uploaded picture content.

Digital watermark technologies can be applied to electronic advertisements (digital signage). For example, by detecting digital watermark information from a moving image obtained by capturing, with a camera, an advertisement motion picture with digital watermark information embedded therein shown on a street screen or a television screen, a user can obtain additional information such as detailed information of a commercial product introduced in the advertisement motion picture.

The content in which a digital watermark is embedded is sometimes degraded because of data compression processing, partial cutout of data, or filtering, for example. Therefore, the embedded digital watermark preferably has a resistance to degradation of data so as to be able to be detected by a digital watermark detecting device even if such data degradation occurs. Particularly in cases where a digital watermark is used for the purpose of protection for copyright, it is preferable that a digital watermark be able to withstand such an attack as one in which a malicious user analyzes a digital watermark and invalidates the digital watermark.

One of such attacks for invalidating a digital watermark is called a "collusion attack". In an example of the collusion attack, a plurality of users separately obtain contents that are identical and in which different digital watermarks are embedded, and compare the contents to one another, so that the digital watermarks are analyzed. For example, data of portions corresponding to one another of the contents that are identical and in which different digital watermarks are embedded is averaged, which results in creating the content with the degraded digital watermark.

Digital watermarks having resistance to such a collusion attack are being studied.

For example, D. Boneh and J. Shaw, "Collusion-Secure Fingerprinting for Digital Data", in Proc of CRYPTO'95, LNCS 963, 1995, pp. 452-465" and G. Tardos, "Optimal Probabilistic Fingerprint Codes", in STOC'03, ACM (2003), 2003, pp. 116-125" has proposed a collusion-secure code with which, when c users make a collusion attack on data with a digital watermark embedded therein, there is a probability equal to or less than $\epsilon$ that digital watermark information for a user who is not a member of the collusion is detected. Unfortunately, the lengths of collusion-secure codes proposed in the above documents are very long and therefore are difficult to use. Japanese Laid-open Patent Publication No. 2007-178857 proposes a technique of reducing the lengths of collusion-secure codes. In this technique, a plurality of candidates of a threshold used for tracing an authorized user are generated by calculation, and a plurality of code lengths corresponding to the respective ones of the plurality of threshold candidates are obtained by calculation. Of the values of the plurality of code lengths, the smallest value is selected. Using the selected code length, codewords that differ from one user to another are generated.

Japanese Laid-open Patent Publication No. 2007-324720 proposes a technique of adding redundant bits to digital watermark information to generate an error correction codeword and embedding the error correction codeword in the content. It is also proposed that, for the error correction codeword, a plurality of pieces of scramble data is generated by using a plurality of different keys, and each scramble data is embedded as individual digital watermark information in the original content.

SUMMARY

In accordance with an aspect of the embodiments, an digital watermark embedding device including an interface unit configured to acquire content in a digital form and digital watermark information, the device includes, a codeword generating unit configured to generate a base codeword including a bit sequence including the digital watermark information; a shifting unit configured to generate a plurality of correcting codewords differing from one another by permutating an arrangement in the bit sequence included in the base codeword depending on a plurality of shift amounts, the plurality of shift amounts differing from one digital watermark information to another, under a predetermined permutation rule; and a watermark superimposing unit configured to embed the plurality of correcting codewords in the content.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

A digital watermark embedding device will be described below with reference to the accompanying drawings. The digital watermark embedding device generates a plurality of codewords obtained by cyclically shifting a bit sequence including digital watermark information by the shift amounts that differ from one another and are determined by random numbers, and embeds the plurality of codewords in contents. Further, the digital watermark embedding device changes random numbers used for determining the shift amounts whenever embedding different digital watermark information, thereby imparting a resistance to collusion attacks to the digital watermark information.

It is to be noted that the content as used in this embodiment is electronic data, such as moving image data representing a picture, or sound data, for example.

Figure 1:
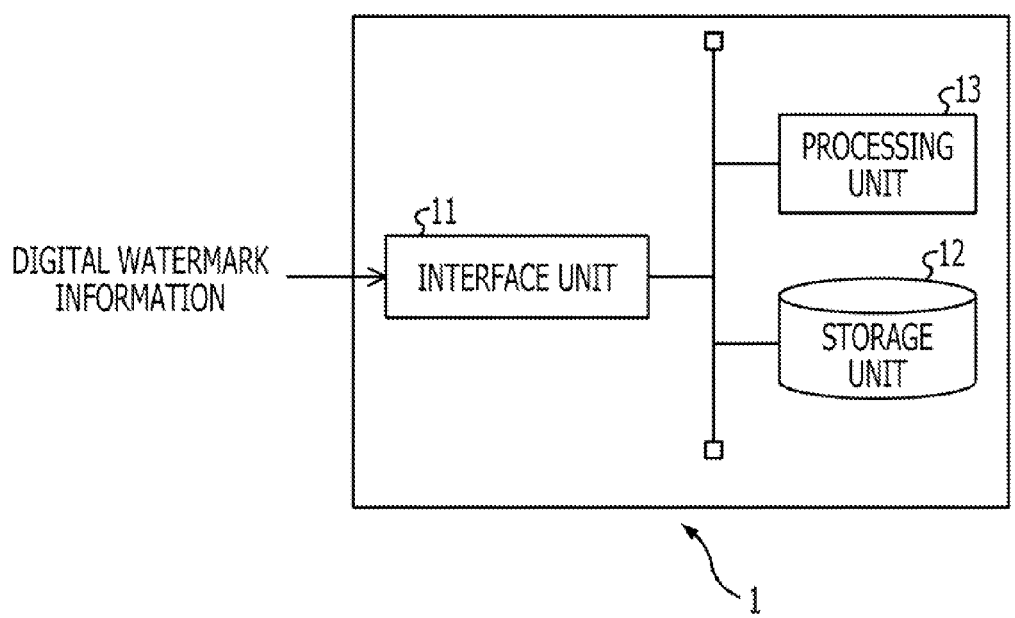
FIG. 1 is a schematic structure diagram of a digital watermark embedding device according to a first embodiment.

FIG. 1 is a schematic structure diagram of the digital watermark embedding device according to the first embodiment. A digital watermark embedding device 1 includes an interface unit 11, a storage unit 12, and a processing unit 13. The digital watermark embedding device 1 embeds digital watermark information in contents acquired through the interface unit 11.

The interface unit 11 includes, for example, a signal interface for connecting the digital watermark embedding device 1 to an input device (not illustrated) such as a camcorder, or a display device (not illustrated) such as a liquid crystal display, and a control circuit therefor. The interface unit 11 may include a communication interface for connecting the digital watermark embedding device 1 to a communication network in compliance with communication standards such as Ethernet (registered trademark), and a control circuit therefor. Alternatively, the interface unit 11 connects an antenna for receiving the content distributed wirelessly to the digital watermark embedding device 1, and includes a circuit for decoding the content received via the antenna. The interface unit 11 acquires the content from the input device, or via the communication network or the antenna, and transmits the content to the processing unit 13. Further, the interface unit 11 may include an interface circuit in compliance with a bus standard, such as USB (Universal Serial Bus), for connecting a user interface device such as a keyboard or a mouse to the digital watermark embedding device 1. The interface unit 11 acquires, from the user interface device or the communication network, data to be embedded as digital watermark information in the content, and then transmits the data to the processing unit 13.

The digital watermark information includes at least one of the identification number of a viewer, the identification number of the source of the content, and the identification number of a content reproducing device, such as an image display device or an audio device, in which the digital watermark embedding device 1 is incorporated, for example. Herein, a plurality of numerals or symbols representing the identification number of a viewer included in digital watermark information are represented in bit sequences.

Further, the interface unit 11 receives from the processing unit 13 the content in which digital watermark information is embedded, and outputs the content with the digital watermark information embedded therein to an output device such as a liquid crystal display or a speaker. Alternatively, the interface unit 11 may send the content with the digital watermark information embedded therein to another device connected through a communication network to the digital watermark embedding device 1.

The storage unit 12 includes at least one of a semiconductor memory, a magnetic disk unit, and an optical disk unit, for example. The storage unit 12 stores a computer program to be executed in the digital watermark embedding device 1, and various parameters used for embedding digital watermark information. Also, the storage unit 12 may temporarily store part of the content before digital watermark information is embedded therein, and the digital watermark information, until the content with the digital watermark information embedded therein is created by the processing unit 13. Further, the storage unit 12 may store the content with digital watermark information embedded therein.

The processing unit 13 includes one or a plurality of processors, a memory circuit such as a random-access memory, and a peripheral circuit. The processing unit 13 controls the entire digital watermark embedding device 1.

Further, the processing unit 13 generates a base codeword including digital watermark information, and embeds, in the content, a plurality of correcting codewords obtained by cyclically shifting part of the base codeword by shift amount determined depending on a random number.

Figure 2:
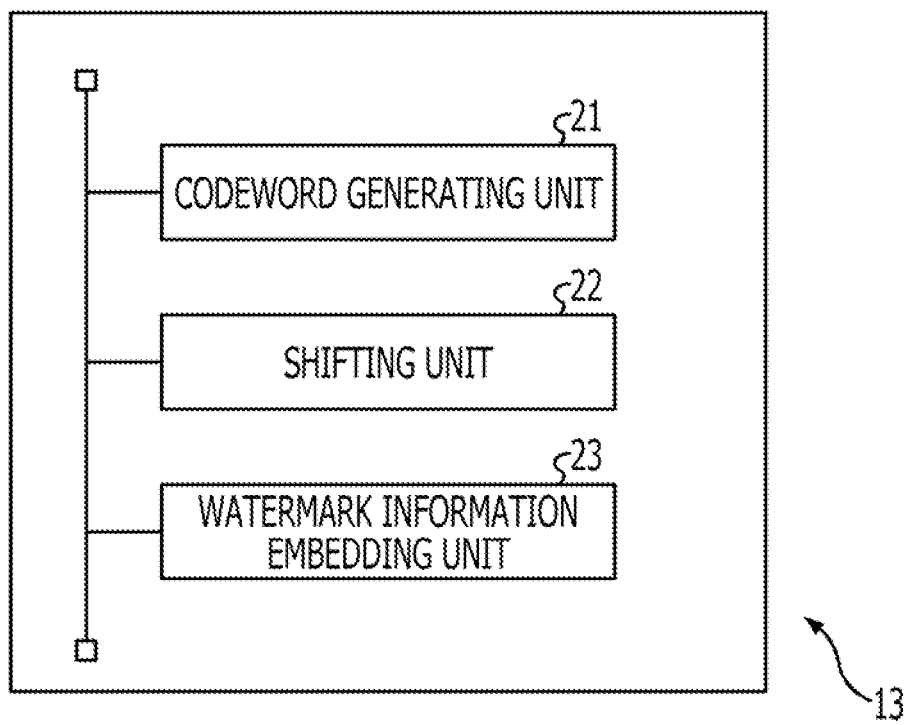
FIG. 2 is a block diagram illustrating functions of a processing unit that are implemented for embedding digital watermark information in data, according to the first embodiment.

FIG. 2 is a block diagram illustrating functions of the processing unit 13 that are implemented for embedding digital watermark information in the content. The processing unit 13 includes a codeword generating unit 21, a shifting unit 22, and a watermark information embedding unit 23. These units included in the processing unit 13 are function modules implemented by a computer program executed on a processor that the processing unit 13 has. Alternatively, the codeword generating unit 21, the shifting unit 22, and the watermark information embedding unit 23 may be mounted as separate arithmetic circuits in the digital watermark embedding device 1.

Figure 3:
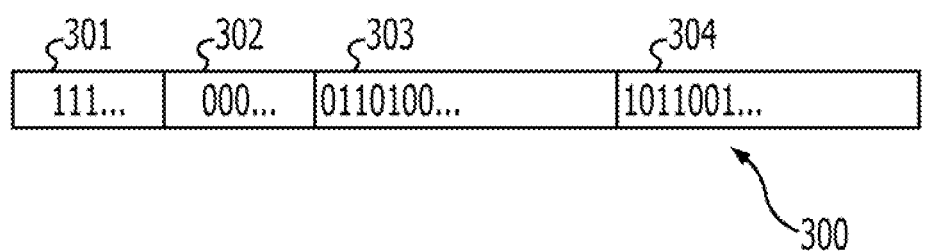
FIG. 3 illustrates an example of a base codeword.

The codeword generating unit 21 generates a base codeword including digital watermark information. FIG. 3 illustrates an example of a base codeword. A base codeword 300 includes, in sequence from the top, a position detection code 301, a shift amount detection code 302, a digital watermark information 303, and an error detection/correction code 304. The position detection code 301 is a code indicating the position of a codeword in the content with digital watermark information embedded therein. The shift amount detection code 302 is a code used for the digital watermark detecting device to detect the shift amount in a correcting codeword that has been cyclically shifted by the shifting unit 22 to be described later. The position detection code 301 and the shift amount detection code 302 may be set, for example, to be bit sequences having a predetermined length and being perpendicular to each other so as to allow the digital watermark detecting device to accurately detect the position detection code and the shift amount detection code. For example, the position detection code 301 and the shift amount detection code 302 can be 16-bit sequences '1111111100000000' and '0000111100001111', respectively. The bit lengths of the position detection code 301 and the shift amount detection code 302 are not limited to 16 bits, and may be 8 bits or 32 bits, for example. The bit length of the position detection code 301 and the bit length of the shift amount detection code 302 may be different.

The digital watermark information 303 included in the base codeword 300 is digital watermark information acquired through the interface unit 11. The error detection/correction code 304 is an error detection/correction code for the digital watermark information 303. The error detection/correction code 304 is used for detecting or correcting an error being present in a codeword embedded in the content in cases where the codeword suffers degradation due to data compression processing, superimposition of noise, or a collusion attack, for example. For the error detection/correction code 304, for example, a cyclic redundancy check (CRC) code may be used as an error detection code. For the error detection/correction code 304, a Reed-Solomon code or a low-density parity-check (LDPC) code may be used as an error correction code. The base codeword need not contain an error detection/correction code.

Upon receipt of digital watermark information through the interface unit 11, the codeword generating unit 21 gives a position detection code and a shift amount detection code before the digital watermark information, as mentioned above. The codeword generating unit 21 calculates an error detection code and an error correction code for the digital watermark information. The codeword generating unit 21 adds the error detection code and the error correction code after the digital watermark information, thereby generating a base codeword. Before generating the codeword, the codeword generating unit 21 may perform pre-processing such as encryption of digital watermark information, execution of scrambling that permutates a bit sequence included in digital watermark information in units of predetermined blocks, or spread spectrum. In this case, the codeword generating unit 21 includes in the base codeword the digital watermark information on which the pre-processing has been performed. In cases where digital watermark information is represented by a bit sequence whose length is larger than a predetermined bit length, the codeword generating unit 21 may divide the bit sequence into the predetermined bit length, and generate a base codeword for each divided bit sequence. The codeword generating unit 21 passes the generated base codeword to the shifting unit 22.

Figure 4:
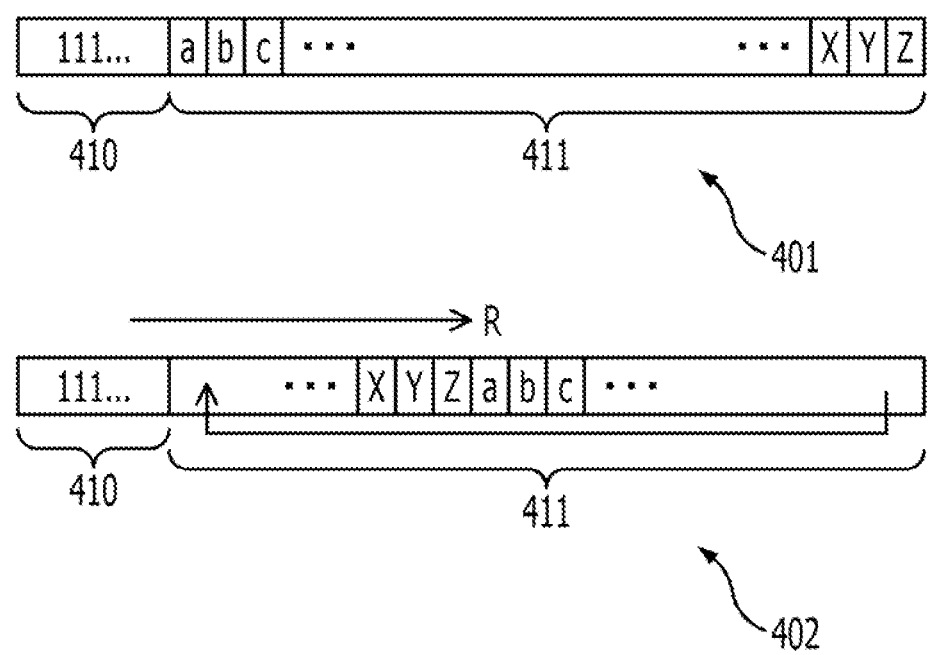
FIG. 4 illustrates an example of a base codeword and a correcting codeword.

The shifting unit 22 generates a correcting codeword by permutating the sequence of a portion, except for the position detection code, of the base codeword, that is, a portion to be cyclically shifted that is a bit sequence including the shift amount detection code, the digital watermark information, and the error detection/correction code under a predetermined permutation rule. In this embodiment, the shifting unit 22 cyclically shifts the portion to be cyclically shifted, thereby generating a correcting codeword. FIG. 4 illustrates an example of a base codeword and a correcting codeword. In FIG. 4, in a correcting codeword 402, a portion 411 to be cyclically shifted, except for a position detection code 410, is shifted rightward by R bits, which is a shift amount, compared to a base codeword 401. The R bits at the far end in the base codeword 401 are moved to be positioned after the position detection code and before the shift amount detection code.

In this embodiment, the shifting unit 22 generates a plurality of correcting codewords from one base codeword for one content. At this point, the shifting unit 22 determines the shift amounts of correcting codewords by the respective individual random numbers or pseudo-random numbers. For example, the shifting unit 22 generates a random number for every correcting codeword according to a random variate generation method such as a linear congruential generator, Mersenne twister, or a random number generation method using Advanced Encryption Standard (AES) encryption. The random number is, for example, an integer equal to or more than 0 and less than a bit length M of a portion to be cyclically shifted. The shifting unit 22, for example, generates random number sequences that differ from one correcting codeword to another using seeds that differ from one correcting codeword to another so that, from any one random number, another random number cannot be estimated, and selects, as a shift amount, any random number in each random number sequence. Alternatively, the following method may be employed. That is, a plurality of random numbers the number of which is equal to the number of correcting codewords are selected from one random number sequence. The plurality of selected random numbers indicate what random numbers are to be selected from other random number sequences. The shifting unit 22 uses a plurality of selected random numbers as shift amounts.

Further, even for the same content, the shifting unit 22 determines the shift amounts of correcting codewords using different random numbers or pseudo-random numbers every time new digital watermark information is embedded. Accordingly, sets of shift amounts of correcting codewords differ from one another among a plurality of contents in which digital watermark information is embedded.

It is to be noted that the number of correcting codewords generated for one content may be set in such a manner that the number of correcting codewords increases as the data volume of the content increases. For example, the number of correcting codewords to be generated can be a value obtained by dividing the data volume of the content by the data volume required for embedding one correcting codeword. In the case where the value exceeds a predetermined upper limit, however, the shifting unit 22 may set the number of correcting codewords to be generated as the upper limit. The upper limit can be 5 or 10, for example. The shifting unit 22 passes a plurality of generated correcting codewords to the watermark information embedding unit 23.

The watermark information embedding unit 23 embeds in the content the plurality of correcting codewords received from the shifting unit 22. The watermark information embedding unit 23 can use any of various methods of embedding digital watermark information suitable for the content in order to embed digital watermark information. For example, in cases where the content is sound data, the watermark information embedding unit 23 embeds a correcting codeword in the human inaudible range. At this point, the watermark information embedding unit 23 generates a signal in accordance with the value of every bit included in the correcting codeword. Then, the watermark information embedding unit 23 superimposes, in chronological order, signals in accordance with the values of bits in order from the first bit of a correcting codeword on the inaudible range of sound data.

In cases where the content is moving image data, the watermark information embedding unit 23 embeds bits of a correcting codeword one by one in order from the first bit in a plurality of images arranged in chronological order that are included on the moving image data. For example, the watermark information embedding unit 23 sets the luminance values of pixels at a predetermined position of the images to luminance values in accordance with the values of bits in order from the first bit of a correcting codeword. The predetermined position may be, for example, any pixel at the four corners of an image.

Further, the watermark information embedding unit 23 may set a predetermined interval including a plurality of images in each bit in a correcting codeword, generate a watermark pattern to be superimposed on each of the images in the predetermined interval, and periodically vary the area of the watermark pattern in accordance with the bit value. In this case, the watermark information embedding unit 23 varies the phase of periodical time variation of the area of a watermark pattern or the period of the time variation in accordance with the values of bits to be embedded. As a result of this, the average pixel value in a reference region that is set in the entirety or part of an image and in which a watermark pattern is included periodically increases and decreases, and therefore the phase of periodical time variation of the average pixel value in the reference region or the period of the time variation also varies. The reference region is set so as to include a watermark pattern in the case where the area is maximum and to have a constant size. That is, the reference region includes an area where a watermark pattern is superimposed on an image, regardless of the area of the watermark pattern.

Figure 5:
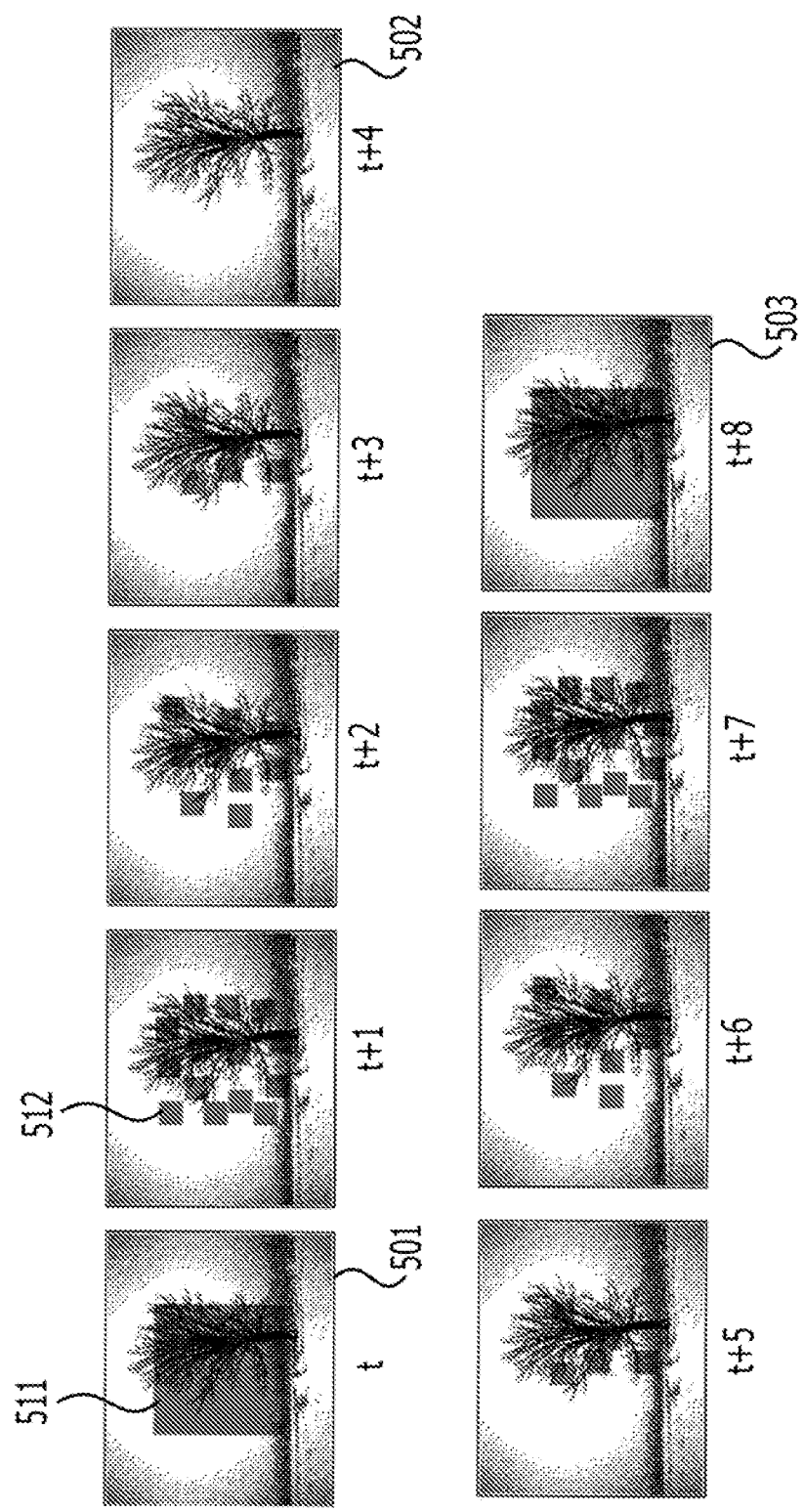
FIG. 5 illustrates an example of temporal changes in one period of a watermark pattern.

FIG. 5 illustrates an example of temporal changes in one period of a watermark pattern. In this example, the watermark pattern includes a plurality of watermark blocks, and pixels included in each watermark block have a negative value "−2", for example. Therefore, each watermark block is opaque, resulting in that the watermark pattern is superimposed on pixels in a region including the watermark pattern, and therefore the pixels with the watermark pattern superimposed thereon have values lower than the original pixels. Illustrated in FIG. 5 are nine images that are temporally successive from time t to time (t+8). A watermark pattern 511 in a rectangular shape is superimposed on an image at time t. The number of watermark blocks 512 decreases from time t to time (t+4), and therefore the area of the watermark pattern superimposed on the image decreases. In an image 502 at time (t+4), the watermark pattern disappears. After time (t+4), the area of the watermark pattern increases and is maximum again in an image 503 at time (t+8).

Figure 6:
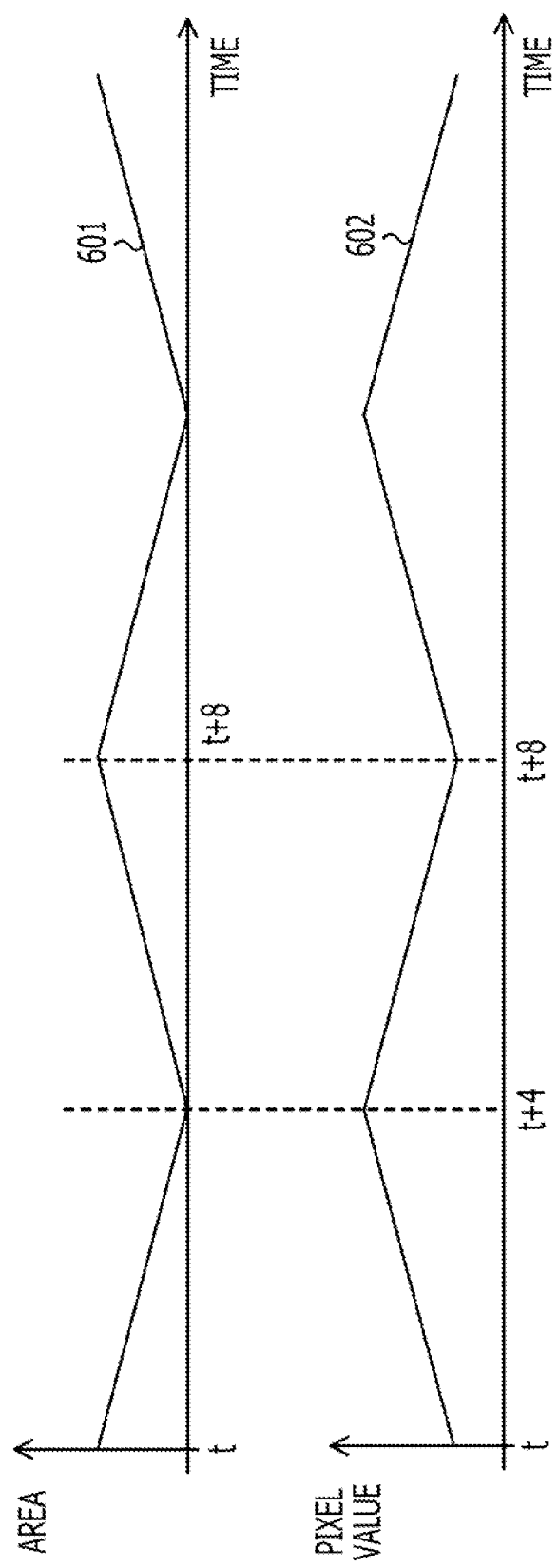
FIG. 6 includes graphs representing temporal changes in the average value of pixel values in a reference region, corresponding to FIG. 5.

FIG. 6 includes graphs representing a corresponding relation between the temporal changes in the area of a watermark pattern and the temporal changes in the average value of pixel values in a region including the watermark pattern, corresponding to FIG. 5. In the upper graph in FIG. 6, the horizontal axis represents the time, and the vertical axis represents the area of the watermark pattern. A graph 601 represents the areas of the watermark pattern at time t to (t+8). On the other hand, in the lower graph, the horizontal axis represents the time, and the vertical axis represents the pixel value. A graph 602 represents the average pixel values in the reference region at time t to (t+8).

As illustrated in the graph 601, the area of the watermark pattern changes in the form of a triangular wave in time t to (t+8). In this example, each pixel of the watermark pattern has a negative value. Therefore, as illustrated in the graph 602, the average pixel value in the reference region increases as the area of the watermark pattern decreases, and the former decreases as the latter increases. Therefore, the average pixel value also changes in the form of a triangular wave in chronological order, and the phase of a triangular wave representing the change in average pixel value is inverted with respect to the phase in the area of the watermark pattern.

Figure 7:
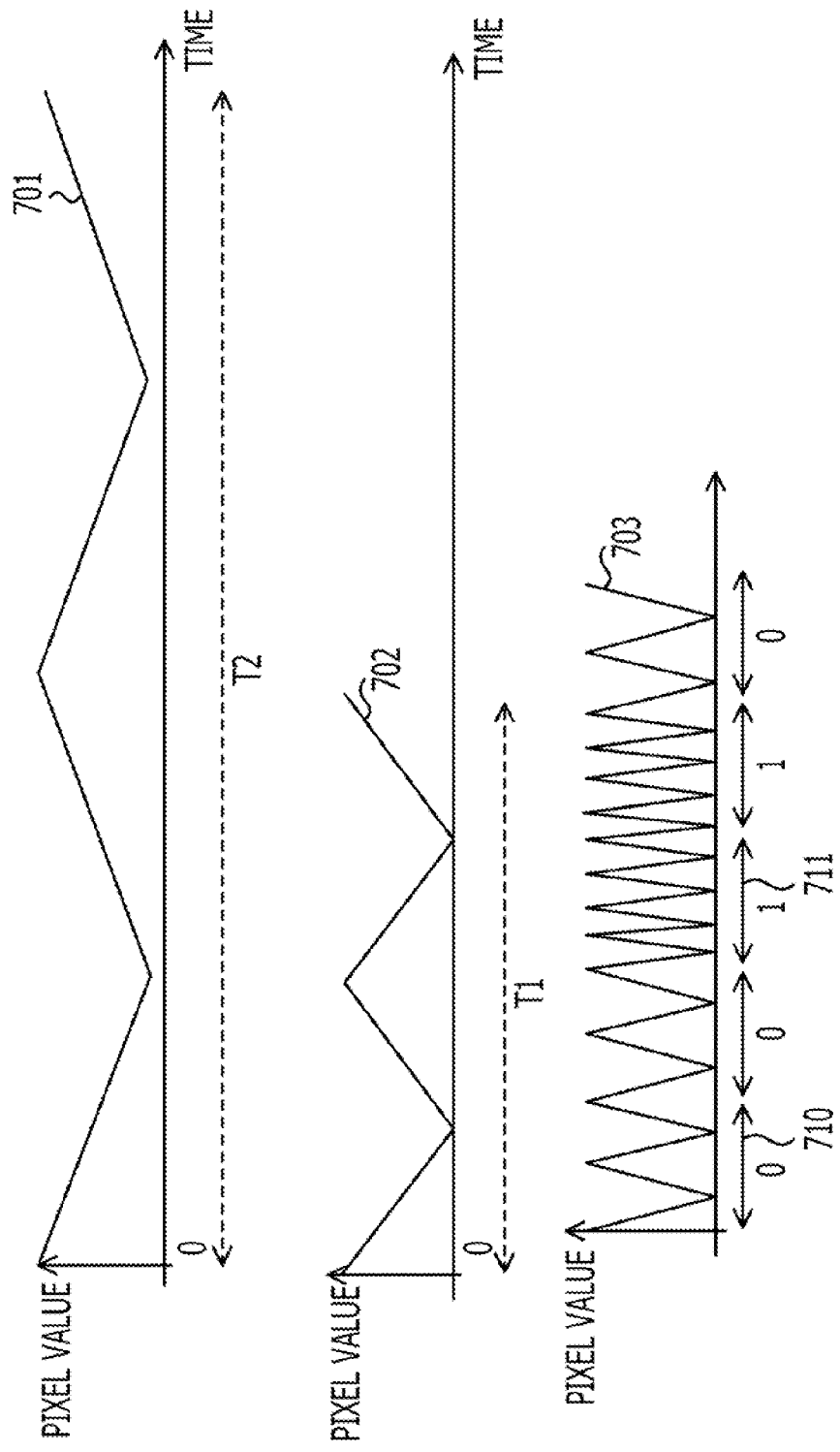
FIG. 7 illustrates an example of relations between the time and the values of embedded bits of the watermark pattern.

As described above, as an example, the values of bits embedded in moving image data are represented by using a period in which the area of the watermark pattern varies, that is, a period in which the average pixel value in the reference region varies. FIG. 7 illustrates an example of relations between the time and the values of embedded bits of the watermark pattern. In the upper, central, and lower graphs in FIG. 7, the horizontal axes represent the time, and the vertical axes represent the average pixel value in the reference region. Graphs 701 and 702 each represent variations of the average pixel value in the reference region with time in the case where the value of a bit is '0' and in the case where the value of a bit is '1'. In this example, a period T1 in the case where the value of a bit is '1' is half a period T2 in the case where the value of a bit is '0'. To facilitate detection of embedded values, the lengths of intervals in which one bit is embedded may be the same regardless of the values of bits. For example, as shown in a graph 703 representing the time variation of the average pixel value in the reference region for a plurality of bits, in FIG. 7, variations of the average pixel value in two periods are included in one interval 710 in the case where the value of a bit is '0', whereas variations of the average pixel value in four periods are included in one interval 711 in the case where the value of a bit is '1'.

Alternatively, the values of bits embedded in moving image data may be represented by the phase of the time variation of the area of the watermark pattern. The watermark information embedding unit 23 may, for example, invert the phase of the time variation of the area of the watermark pattern in the case where the value of a bit is '1' with respect to the phase of the time variation of the area of the watermark pattern in the case where the value of a bit is '0'.

The watermark information embedding unit 23 specifies the reference region for each image. The watermark information embedding unit 23 modifies the values of pixels on an image on which pixels included in a watermark pattern are superimposed, by using the values of the pixels included in the watermark pattern. For example, in the case where each pixel included in a watermark pattern has a value '−2', the watermark information embedding unit 23 subtracts '2' from the value of each pixel included in a region where the watermark pattern is superimposed on the pixels. Conversely, in the case where each pixel included in the watermark pattern has a value '2', the watermark information embedding unit 23 adds '2' to the value of each pixel included in the region where the watermark pattern is superimposed on the pixels.

As mentioned above, the watermark information embedding unit 23 can embed a plurality of bits in a time series direction in moving image data. In this case, every time the interval corresponding to one bit embedded in moving image data finishes, the watermark information embedding unit 23 may superimpose a predetermined pattern indicating a partition for each bit on images before the interval corresponding to the next bit begins.

Also, the watermark information embedding unit 23 may embed a plurality of bits included in digital watermark information in each image in moving image data. For example, a plurality of predetermined pixels in each image are used for representing the values of bits included in a correcting codeword. Alternatively, a plurality of reference regions and a watermark pattern included in each of the reference regions are set in each image in the moving image data. Each reference region and a watermark pattern superimposed thereon correspond to one bit. In the case where all bits included in digital watermark information are embedded in each image, the predetermined interval may be from the top image to the final image of moving image data.

Likewise, in the case where the content is sound data, the watermark information embedding unit 23 may embed one bit included in a correcting codeword into each of a plurality of frequency bands in the inaudible range of one frame of the sound data.

The watermark information embedding unit 23 embeds each of a plurality of correcting codewords in the content in such a manner as mentioned above. The watermark information embedding unit 23 causes the content with the plurality of correcting codewords embedded therein to be stored in the storage unit 12. Alternatively, the watermark information embedding unit 23 may output the content with the plurality of correcting codewords embedded therein through the interface unit 11 to another device.

Figure 8:
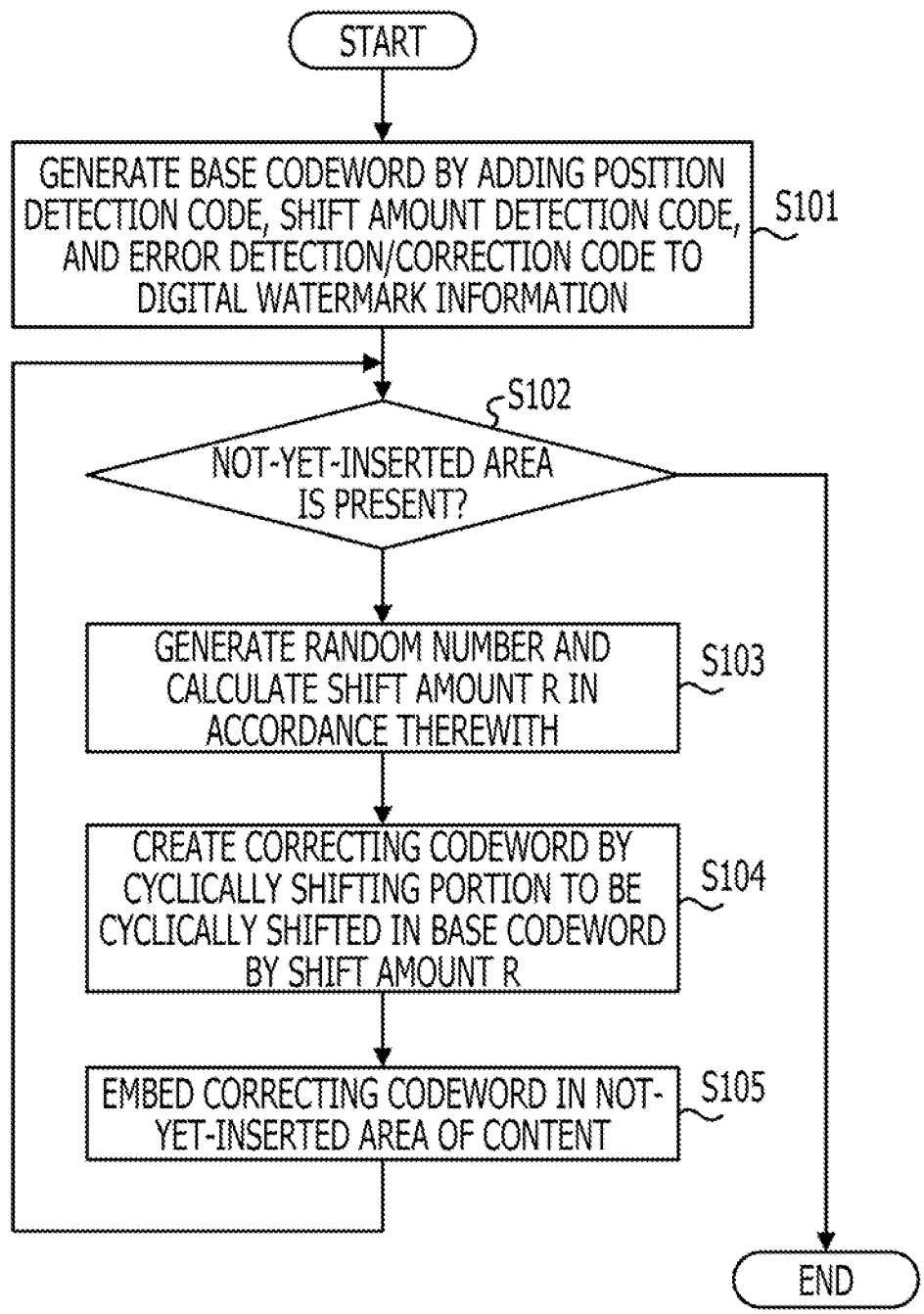
FIG. 8 is an operation flowchart of a digital watermark embedding process to be controlled by a computer program executed in a processing unit of a digital watermark embedding device.

FIG. 8 is an operation flowchart of a digital watermark embedding process to be controlled by a computer program executed in the processing unit of the digital watermark embedding device according to this embodiment. The codeword generating unit 21 of the processing unit 13 generates a base codeword by adding a position detection code, a shift amount detection code, and an error detection/correction code to digital watermark information received through the interface unit 11 (operation S101). The codeword generating unit 21 passes the base codeword to the shifting unit 22. The processing unit 13 determines whether a not-yet-inserted area is present in the content received through the interface unit 11 (operation S102). The term "not-yet-inserted area" used herein refers to an area where a correcting codeword has not yet been embedded and a correcting codeword can be embedded. For example, if the content is sound data, this area is the inaudible range in which a correcting codeword has not yet been embedded and on which the data volume of the correcting codeword can be superimposed. Alternatively, if the content is moving image data, the not-yet-inserted area is, for example, a plurality of images in which a correcting codeword has not yet been embedded and that correspond to the total number of bits included in the correcting codeword.

If the not-yet-inserted area is present in the content (operation S102: Yes), then the shifting unit 22 generates a random number, and calculates a shift amount R in accordance with the random number (operation S103). The shifting unit 22 creates a correcting codeword by cyclically shifting the portion to be cyclically shifted, except for the position detection code, in the base codeword by the shift amount R (operation S104). The shifting unit 22 passes the correcting codeword to the watermark information embedding unit 23. The watermark information embedding unit 23 embeds the correcting codeword received from the shifting unit 22 in the not-yet-inserted area of the content (operation S105). Then, the processing unit 13 performs again the processing in and after operation S102. On the other hand, if the not-yet-inserted area is absent in the content (operation S102: No), then the processing unit 13 finishes the digital watermark embedding process.

Next, a digital watermark detecting device that detects digital watermark information embedded in the content using the digital watermark embedding device according to the first embodiment will be described.

Figure 9:
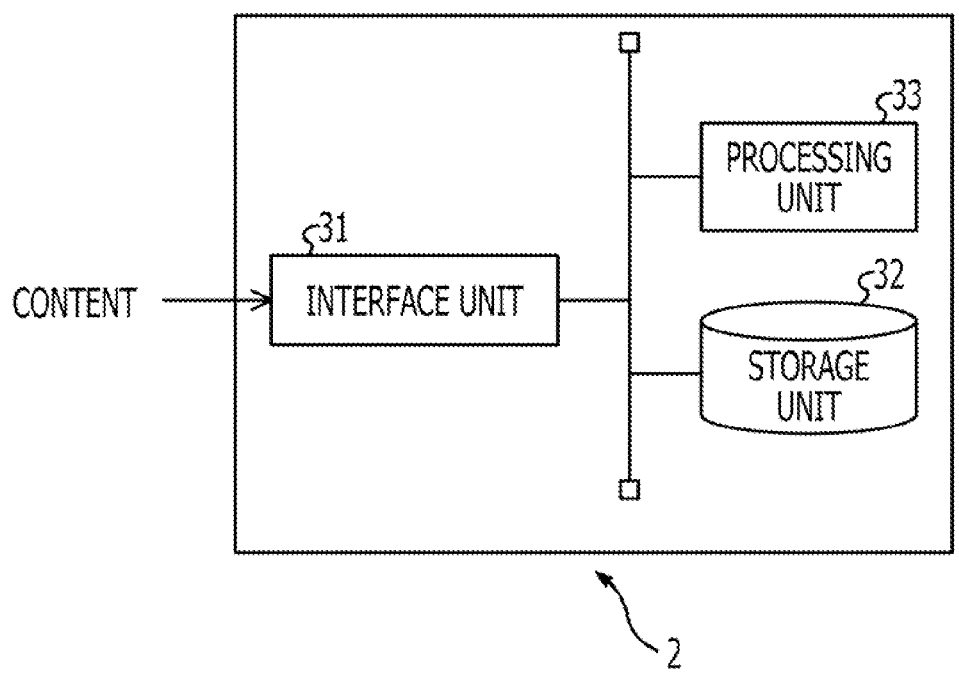
FIG. 9 is a schematic structure diagram of a digital watermark detecting device according to the first embodiment.

FIG. 9 is a schematic structure diagram of a digital watermark detecting device according to the first embodiment. A digital watermark detecting device 2 includes an interface unit 31, a storage unit 32, and a processing unit 33. The digital watermark detecting device 2 detects digital watermark information embedded in the content acquired through the interface unit 31.

The interface unit 31 includes, for example, a signal interface for connecting the digital watermark detecting device 2 to a content input device (not illustrated), such as a camcorder, and a control circuit therefor. Alternatively, the interface unit 31 may include a communication interface for connecting the digital watermark detecting device 2 to a communication network in compliance with communication standards such as Ethernet (registered trademark), and a control circuit therefor. The interface unit 31 acquires the content with digital watermark information embedded therein via the content input device or the communication network, and passes the content to the processing unit 33. Further, the interface unit 31 may receive the detected digital watermark information from the processing unit 33 and then pass the digital watermark information to another device that is connected via the communication network to the digital watermark detecting device 2.

The storage unit 32 includes at least one of a semiconductor memory, a magnetic disk unit, and an optical disk unit, for example. The storage unit 32 stores a computer program to be executed in the digital watermark detecting device 2, and various parameters used for detecting digital watermark information embedded in the content. For example, the storage unit 32 stores a template of a position detection code and a template of a shift amount detection code. The storage unit 32 may store the detected digital watermark information.

Further, the storage unit 32 may store the content with digital watermark information embedded therein.

The processing unit 33 includes one or more processors, a memory circuit such as a random-access memory, and a peripheral circuit. The processing unit 33 detects digital watermark information embedded in the content. Further, the processing unit 33 controls the entire digital watermark detecting device 2.

Figure 10:
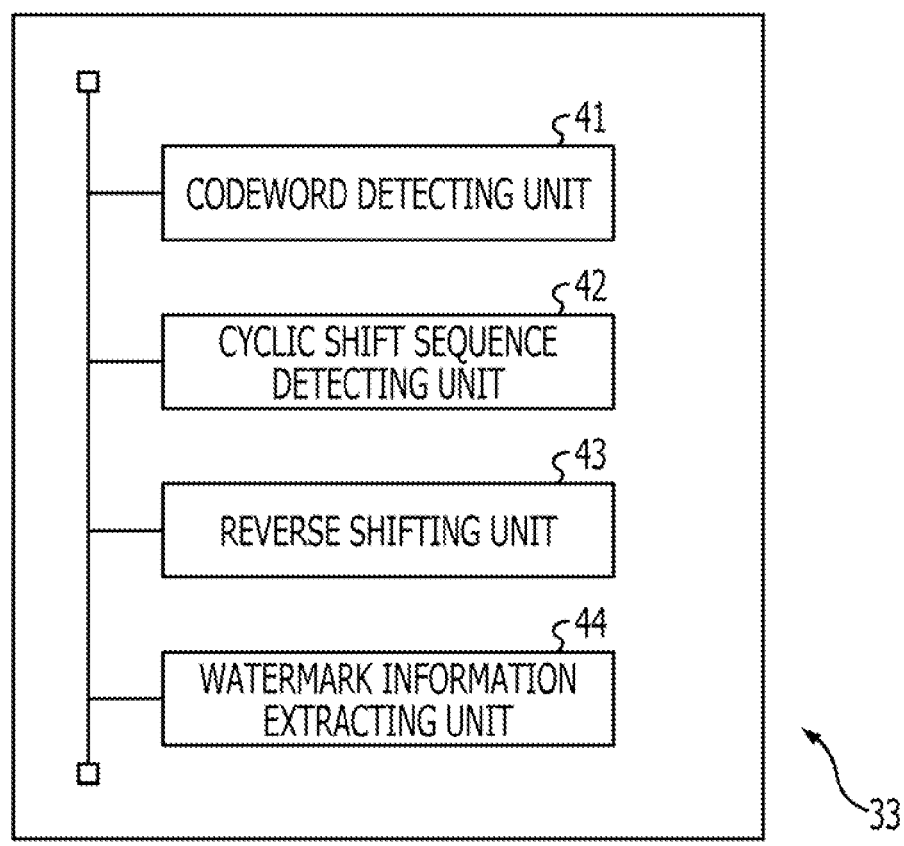
FIG. 10 is a block diagram illustrating functions of a processing unit of the digital watermark detecting device implemented for detecting digital watermark information embedded from the content.

FIG. 10 is a block diagram illustrating functions of the processing unit implemented for detecting digital watermark information embedded in the content. The processing unit 33 includes a codeword detecting unit 41, a cyclic shift sequence detecting unit 42, a reverse shifting unit 43, and a watermark information extracting unit 44.

The codeword detecting unit 41 detects a plurality of correcting codewords embedded in the content. For this purpose, the codeword detecting unit 41 detects bits of each of a plurality of correcting codewords embedded in the content, using a detection method suitable for a bit embedding method used by the digital watermark embedding device 1. For example, as mentioned above, the content is sound data, and signals in accordance with the values of bits included in a correcting codeword are added in the inaudible range of the sound data. In this case, by using a template for matching between a template suitable for the signals and signals in the inaudible range, the codeword detecting unit 41 detects signals that match the template in the inaudible range. Then, the codeword detecting unit 41 detects the values of bits corresponding to the template that has matched the signals, as bits included in the correcting codeword. In cases where the content is moving image data, and predetermined pixels of each image have values corresponding to the values of bits included in a correcting codeword, the codeword detecting unit 41 detects the values of bits corresponding to the values of the predetermined pixels.

In cases where the content is moving image data, and the values of bits included in a correcting codeword are represented by the periodic variations of the area of a watermark pattern superimposed on images, the codeword detecting unit 41 calculates the average pixel value in the reference region of each image. In cases where a plurality of reference regions are set in one image, the codeword detecting unit 41 calculates the average pixel value for each reference region. The moving image data is sometimes obtained by capturing, in analog form, a picture with digital watermark information embedded therein. For such data, the codeword detecting unit 41 specifies the moving image area in each image, for example, by performing edge detection processing of each image to detect an edge of a moving image area where the original picture is present. Then, the codeword detecting unit 41 detects a reference region in the moving image area on the basis of prior knowledge of the ratio between the moving image area and the reference region.

The codeword detecting unit 41 creates, for each reference region, a one-dimensional vector in which average pixel values in the reference region are arranged in chronological order. The codeword detecting unit 41 frequency-converts the one-dimensional vector in each interval corresponding to the value of one bit to determine a spectrum for time variations of the average pixel value in the interval. As the frequency conversion, for example, fast Fourier transform or discrete cosine transform is used. The codeword detecting unit 41 can specify a predetermined pattern indicating a partition between intervals, for example, by detecting the predetermined pattern by pattern matching.

The codeword detecting unit 41 extracts, from the spectrum for every interval for each reference region, only a frequency component corresponding to the time variation of the average pixel value in the reference region due to periodic changes of the area of the watermark pattern. In the case where the value of an embedded bit is represented by the phase of the time variation of the average pixel value in the reference region, the codeword detecting unit 41 obtains phase information from the extracted frequency component. The codeword detecting unit 41 obtains, for example, the value of a bit corresponding to the phase by referring to a reference table showing a relation between the phase and the value of a symbol.

In the case where the value of a bit is represented by the period of the time variation of the area of the watermark pattern, the codeword detecting unit 41 obtains the strongest frequency component among frequency components corresponding to possible values of the bit, and obtains the period corresponding to the strongest frequency component. Referring to a reference table showing a relation between the period and the value of a bit, the codeword detecting unit 41 determines that the value of a bit corresponding to the detected period as the value of the embedded bit.

The codeword detecting unit 41 generates a first detection code that is a bit sequence including a plurality of correcting codewords by arranging the extracted values of bits in a predetermined order, such as in chronological order. In the case where a plurality of bits are embedded in one image of moving image data, the codeword detecting unit 41 generates the first detection code by arranging the values of bits in the pre-set order in which the bits are embedded in the image. Likewise, in the case where the content is sound data, and bits are embedded in a plurality of frequency bands of one frame of the sound data, the codeword detecting unit 41 generates the first detection code by arranging the values of bits in the order in which the bits are embedded in the frame. The codeword detecting unit 41 passes the first detection code to the cyclic shift sequence detecting unit 42 and the reverse shifting unit 43.

Of a plurality of correcting codewords included in the first detection code, one correcting codeword serves as the reference. The cyclic shift sequence detecting unit 42 detects relative shift amounts of other correcting codewords included in the first detection code with respect to the correcting codeword serving as the reference. That is, the cyclic shift sequence detecting unit 42 detects the shift amounts that allow the arrangements of bits representing digital watermark information in correcting codewords to match one another. For this purpose, the cyclic shift sequence detecting unit 42 performs pattern matching between the first detection code and a template having the same bit sequence as the position detection code to detect bit sequences matching the template in the first detection code, as the position detection codes included in the correcting codewords. The cyclic shift sequence detecting unit 42 detects a bit sequence ranging from one position detection code to the next position detection code, as one correcting codeword. The content in which digital watermark information is embedded is sometimes degraded because of data compression, analog capture, or other reasons, and therefore the position detection codes included in the first detection code can include errors. To address this, the cyclic shift sequence detecting unit 42 may detect as a position detection code, for example, a bit sequence having a humming distance from the template of the position detection code equal to or less than a predetermined distance. In this case, the predetermined distance is set to a fixed value, such as 1 or 2, or a value, such as $\frac{1}{10}$ of the bit length of the position detection code.

Next, the cyclic shift sequence detecting unit 42 obtains a portion to be cyclically shifted, except for the position detection code, from each correcting codeword. Then, the cyclic shift sequence detecting unit 42 calculates cross-correlation values between the portion to be cyclically shifted of the correcting codeword serving as the reference and the portions to be cyclically shifted of other correcting codewords, for example, by the following equation.

$$r[i][j] = \sum_{k=0}^{M-1} C[0][k]C[i][(k-j)\%M] \quad (1)$$

where $C[0][k]$ denotes a value corresponding to a k-th bit of the portion to be cyclically shifted of the correcting codeword serving as the reference. In this embodiment, the correcting codeword serving as the reference is the top correcting codeword included in the first detection code. The correcting codeword serving as the reference is not limited to the top correcting codeword and may be any of correcting codewords included in the first detection code. Further, $C[i][k]$ denotes the value corresponding to the k-th bit of the portion to be cyclically shifted in an i-th correcting codeword (i=1, 2, ..., N-1, where N is the total number of correcting codewords included in the first detection code), except for the top correcting codeword, included in the first detection code. If the value of the k-th bit is '1', $C[i][k]=1$; if the value of the k-th bit is '0', $C[i][k]=-1$. An operator % is a remainder operator, and A % B denotes the remainder in the case where A is divided by B given that A and B are integers. M is the code length of the portion to be cyclically shifted. Further, $r[i][j]$ denotes the cross-correlation value between the portion to be cyclically shifted of the i-th correcting codeword and the portion to be cyclically shifted of the top correcting codeword in the first detection code in the case where the portion to be cyclically shifted of the i-th correcting codeword is cyclically shifted rightward by j bits. The portions to be cyclically shifted have the same value, except that the amounts by which the portions are to be cyclically shifted are different, unless the correcting codewords are rewritten. Accordingly, the cross-correlation value is the largest in the case where the relative shift amount between the portion to be cyclically shifted of the i-th correcting codeword and the portion to be cyclically shifted of the top correcting codeword is cancelled.

While changing the shift amounts j of the portions to be cyclically shifted of the first and the subsequent correcting codewords from 0 to (M-1), the cyclic shift sequence detecting unit 42 calculates the cross-correlation values between the portions to be cyclically shifted of each correcting codeword and the portion to be cyclically shifted of the top correcting codeword, and obtains the maximum value of the cross-correlation values. The cyclic shift sequence detecting unit 42 determines that a shift amount jmax corresponding to the maximum value of the cross-correlation value for the portion to be cyclically shifted of the i-th correcting codeword is the relative shift amount of the i-th correcting codeword with respect to the shift amount of the top correcting codeword.

The cyclic shift sequence detecting unit 42 notifies the reverse shifting unit 43 of the relative shift amounts of correcting codewords other than the correcting codeword serving as the reference.

The reverse shifting unit 43 cyclically shifts the portion to be cyclically shifted of each of correcting codewords other than the correcting codeword serving as reference rightward by the relative shift amount jmax suitable for the concerning correcting codeword. Thus, the shift amount of the portion to be cyclically shifted in the correcting codeword serving as the reference matches the shift amount of the portion to be cyclically shifted in each of other correcting codewords.

For each of bits corresponding to one another in the portions to be shifted of correcting codewords, the reverse shifting unit 43 determines the value of the bit using the majority decision rule by the following equation, so that a second detection code is generated.

$$tmp[j] = \sum_{i=0}^{N-1} C[i][(j-S[i])\%M] \quad (2)$$

$$C*[j] = \begin{cases} 1 & tmp[j] > 0 \\ 0 & tmp[j] \le 0 \end{cases}$$

where $C[i][k]$ denotes the value corresponding to the k-th bit of the portion to be cyclically shifted in the i-th correcting codeword in the first detection code, as in Equation (1). Here, i takes values from 0 to (N-1) such that the top correcting codeword is included. Further, $S[i]$ is a relative shift amount obtained for the i-th correcting codeword, M is the code length of the portion to be cyclically shifted, and $C*[j]$ denotes the value of a j-th bit of the second detection code. The reverse shifting unit 43 calculates $C*[j]$ by Equation (2) while changing j from 0 to (M-1), thereby generating the second detection code. It is to be noted that the cyclic shift sequence detecting unit 42 and the reverse shifting unit 43 need not perform the foregoing processing for all correcting codewords included in the first detection code. The cyclic shift sequence detecting unit 42 and the reverse shifting unit 43 need only to use one of at least two correcting codewords as the correcting codeword serving as the reference and obtain the relative shift amount for the other correcting codeword so as to generate the second detection code.

Figure 11:
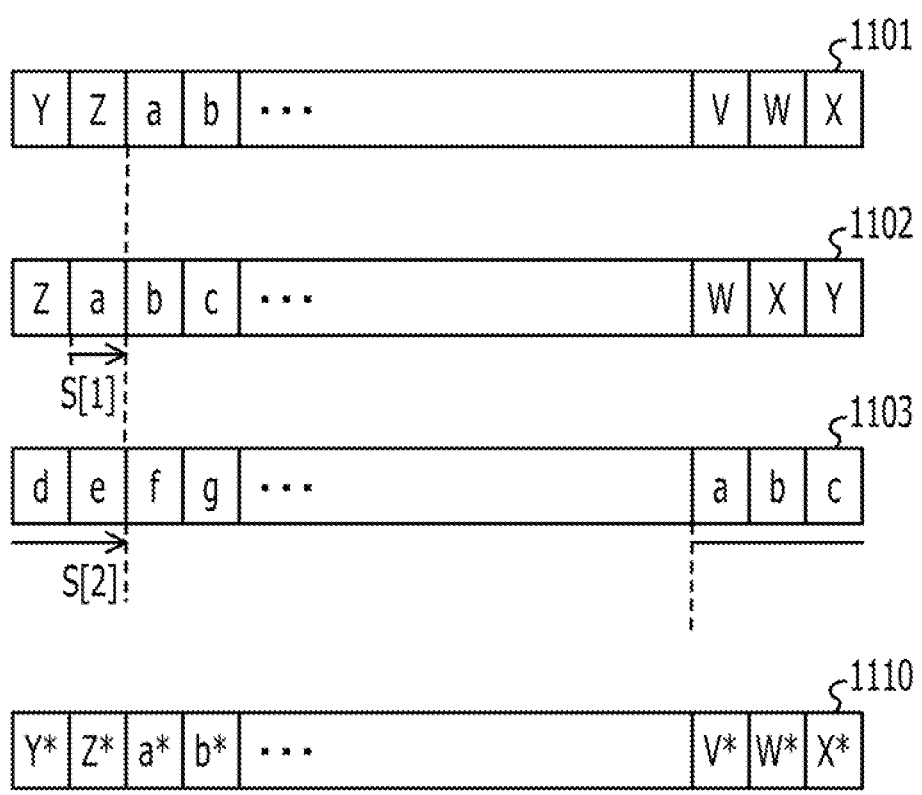
FIG. 11 illustrates an example of a relation between a second detection code and portions to be cyclically shifted of a plurality of correcting codewords in a first detection code.

FIG. 11 illustrates an example of a relation between the second detection code and the portions to be cyclically shifted of a plurality of correcting codewords in the first detection code. In FIG. 11, the shift amount detection code is represented by a bit sequence 'ab'. A portion to be cyclically shifted 1101 of the correcting codeword serving as the reference is obtained by cyclically shifting the portion to be cyclically shifted of a base codeword rightward by 2 bits, and, as a result, the bits 'a' and 'b' are positioned at the third and the fourth from the top, respectively. In contrast, portions to be cyclically shifted 1102 and 1103 of other two correcting codewords are shifted leftward by S[1] bit and S[2] bit, respectively, relative to the portion to be cyclically shifted 1101. As a result, when the portions to be cyclically shifted 1102 and 1103 are cyclically shifted rightward by S[1] bit and S[2] bit, respectively, the cross-correlation value between the portions to be cyclically shifted 1102 and 1103 and the portion to be cyclically shifted 1101 is maximum. Therefore, the reverse shifting unit 43 cyclically shifts the portions to be cyclically shifted 1102 and 1103 rightward by S[1] bit and S[2] bit, respectively, and then combines together bits corresponding to each other in the portions to be cyclically shifted 1102 and 1103. Thus, a second detection code 1110 is generated. The second detection code 1110 is formed in such a manner that the portion to be cyclically shifted of the base codeword is cyclically shifted rightward by 2 bits, just as the portion to be cyclically shifted 1101 of the correcting codeword serving as the reference.

The reverse shifting unit 43 performs pattern matching between the second detection code and a template having the same bit sequence as the shift amount detection code, so that a bit sequence that matches the template is detected as the shift amount detection code in the second detection code. Then, the reverse shifting unit 43 cyclically shifts the second detection code in a direction opposite to the direction of cyclically shifting performed by the digital watermark embedding device, so that the shift amount detection code is positioned at the top. In this way, the portion to be cyclically shifted of the base codeword is reproduced. The second detection code is obtained by combining together bits corresponding to one another of the portions to be cyclically shifted of a plurality of correcting codes. Therefore, there is a high possibility that the shift amount detection code included in the second detection code is more accurate than the shift amount detection code included in an individual correcting codeword in the first detection code. Accordingly, the reverse shifting unit 43 can accurately detect the shift amount of the portion to be cyclically shifted in the second detection code. The reverse shifting unit 43 passes the reproduced portion to be cyclically shifted of the base codeword to the watermark information extracting unit 44.

Using the error detection/correction code included in the reproduced portion to be cyclically shifted of the base codeword, the watermark information extracting unit 44 performs error detection processing and error correction processing of that portion to be cyclically shifted. The watermark information extracting unit 44 extracts, from the portion to be cyclically shifted, digital watermark information arranged next to the shift amount detection code. In the case where pre-processing such as encryption of digital watermark information, scrambling, or spread spectrum has been performed on digital watermark information, the watermark information extracting unit 44 reverses the pre-processing of the extracted digital watermark information so as to reproduce information included in the digital watermark information.

The watermark information extracting unit 44 causes the digital watermark information to be stored in the storage unit 32. Alternatively, the watermark information extracting unit 44 may output the digital watermark information through the interface unit 31 to another device.

Figure 12:
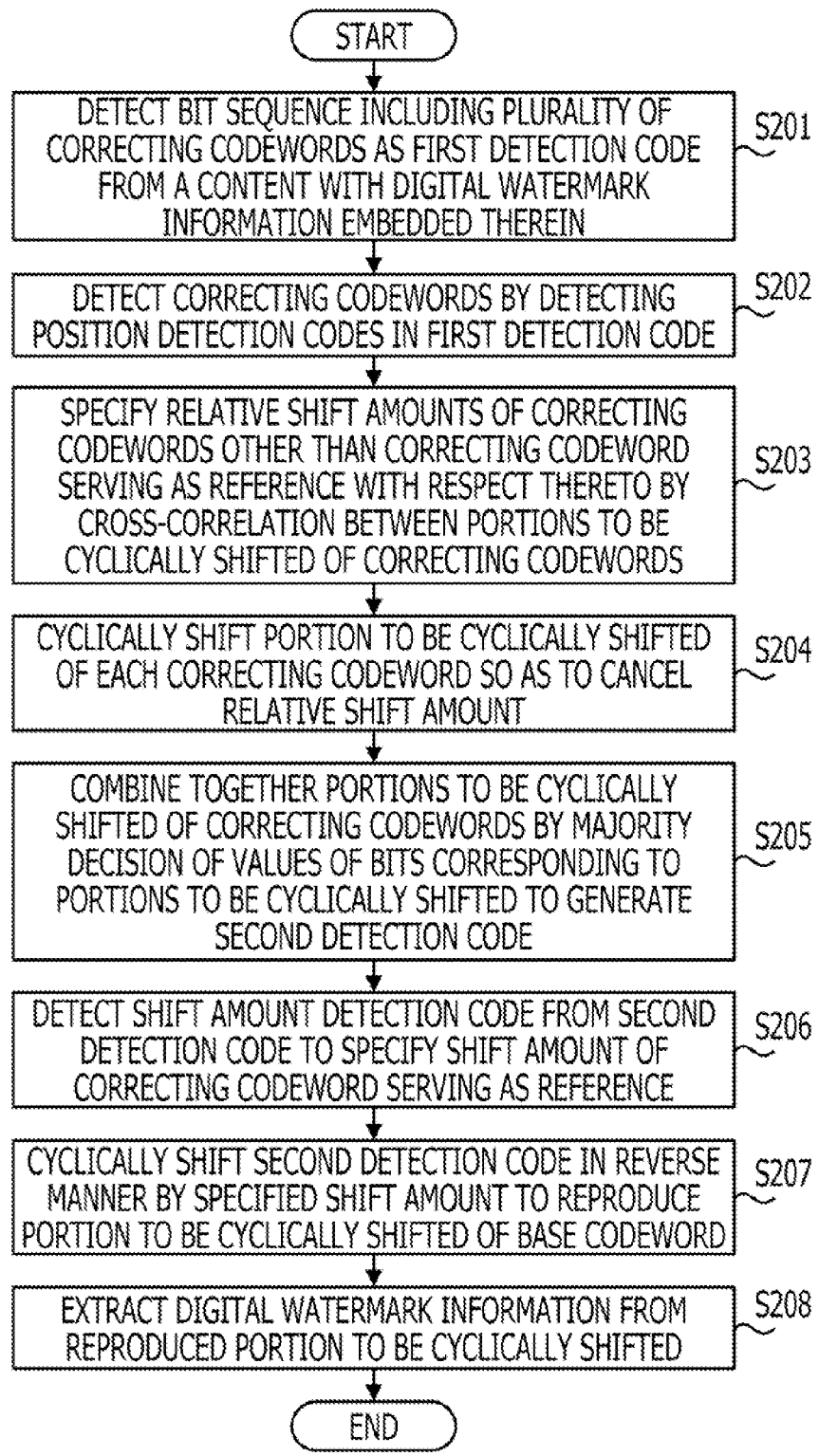
FIG. 12 is an operation flowchart of a digital watermark detecting process.

FIG. 12 is an operation flowchart of a digital watermark detecting process to be controlled by a computer program executed in the processing unit 33 of the digital watermark detecting device 2. The codeword detecting unit 41 of the processing unit 33 detects a bit sequence including a plurality of correcting codewords as a first detection code from the content with digital watermark information embedded therein (operation S201). Then, the codeword detecting unit 41 passes the first detection code to the cyclic shift sequence detecting unit 42 and the reverse shifting unit 43 of the processing unit 33.

The cyclic shift sequence detecting unit 42 detects the correcting codewords by detecting position detection codes in the first detection code (operation S202). The cyclic shift sequence detecting unit 42 specifies the relative shift amounts of correcting codewords other than a correcting codeword serving as the reference with respect to the correcting codeword serving as the reference by cross-correlation between the portions to be cyclically shifted of the correcting codewords (operation S203). The cyclic shift sequence detecting unit 42 notifies the reverse shifting unit 43 of the relative shift amounts of the correcting codewords other than the correcting codeword serving as the reference.

The reverse shifting unit 43 cyclically shifts the portion to be cyclically shifted of each correcting codeword so as to cancel the relative shift amount (operation S204). The reverse shifting unit 43 combines together the portions to be cyclically shifted of the correcting codewords by majority decision of the values of bits corresponding to the portions to be cyclically shifted to generate a second detection code (operation S205). Further, the reverse shifting unit 43 detects the shift amount detection code from the second detection code to specify the shift amount of the correcting codeword serving as the reference (operation S206). The reverse shifting unit 43 cyclically shifts the second detection code in a reverse manner by the specified shift amount to reproduce the portion to be cyclically shifted of the base codeword (operation S207). The reverse shifting unit 43 passes the reproduced portion to be cyclically shifted of the base codeword to the watermark information extracting unit 44 of the processing unit 33.

The watermark information extracting unit 44 extracts digital watermark information from the reproduced portion to be cyclically shifted (operation S208). Then, the processing unit 33 finishes the digital watermark detecting process.

Hereinbelow, it will be described with reference to the drawings that digital watermark information embedded using the digital watermark embedding device according to this embodiment has a resistance to collusion attacks.

Figure 13A:
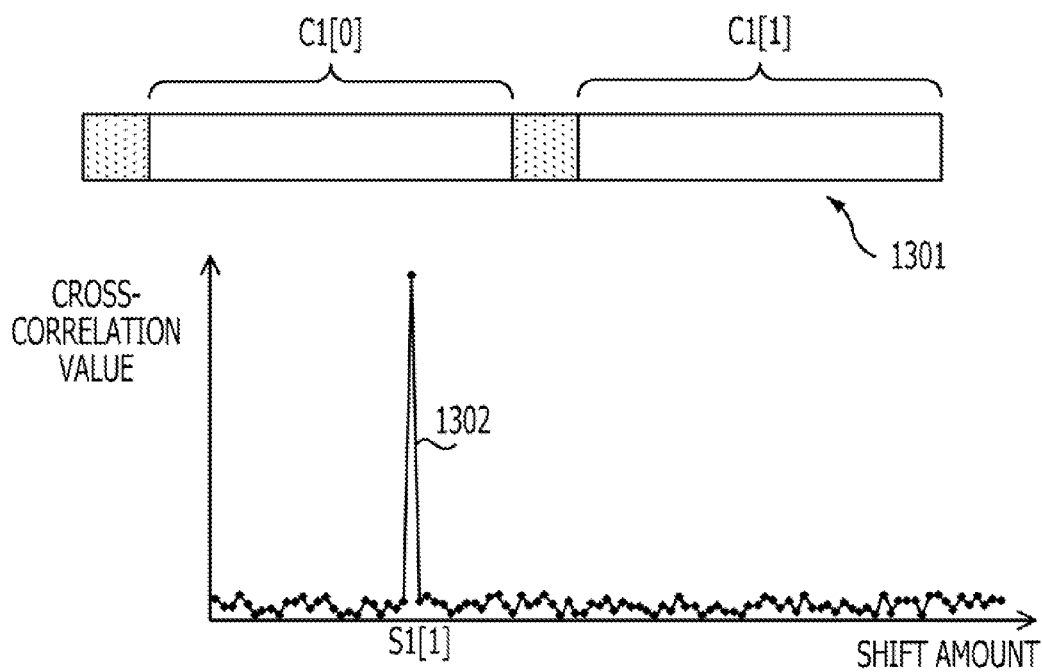
FIG. 13A illustrates an example of the first detection code detected from the content and an example of the cross-correlation value between two portions to be cyclically shifted included in the first detection code.
Figure 13B:
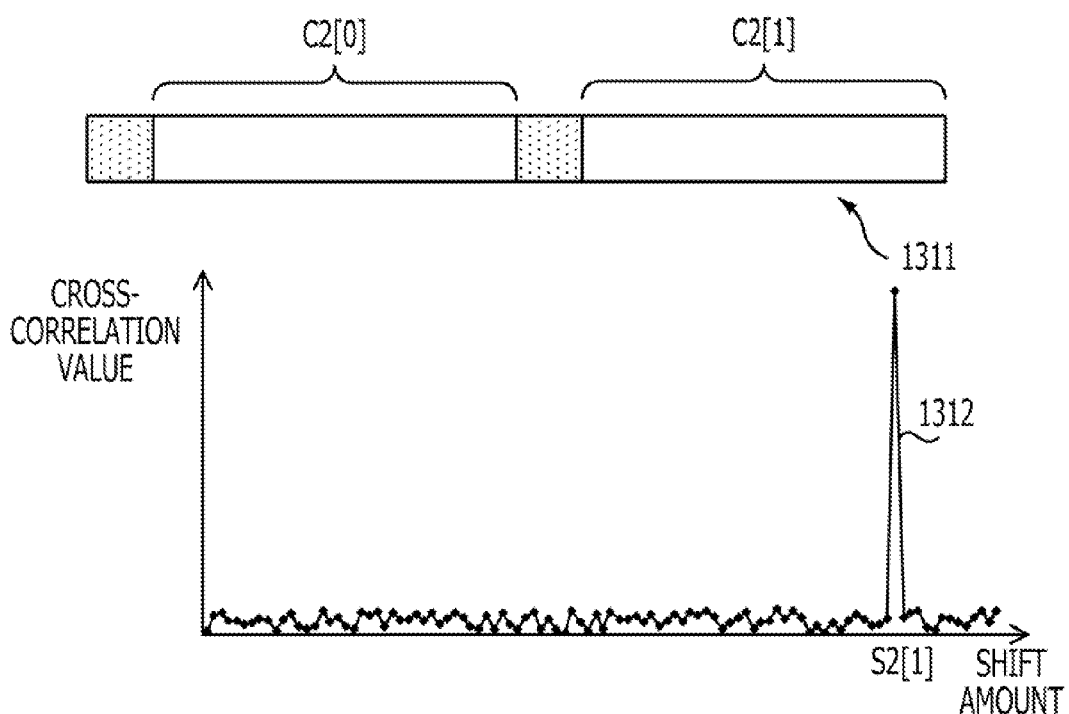
FIG. 13B illustrates an example of the first detection code detected from the content in which different digital watermark information is embedded and that is the same as the content illustrated in FIG. 13A, and an example of the cross-correlation value between two portions to be cyclically shifted included in the first detection code.

FIG. 13A illustrates an example of a first detection code detected from the content and an example of the cross-correlation value between two portions to be cyclically shifted included in the first detection code. FIG. 13B illustrates an example of a first detection code detected from the content in which different digital watermark information is embedded and that is the same as the content illustrated in FIG. 13A, and an example of the cross-correlation value between two portions to be cyclically shifted included in the first detection code.

In a first detection code 1301 illustrated in FIG. 13A, two correcting codewords are included, and portions to be cyclically shifted C1[0] and C1[1] are included in the two correcting codewords, respectively. A graph illustrated on the lower side of FIG. 13A represents the cross-correlation value between the portions to be cyclically shifted C1[0] and C1[1]. In this graph, the horizontal axis represents the relative shift amount of C1[1] with respect to C1[0], and the vertical axis represents the cross-correlation value. A graph 1302 represents the cross-correlation value for each relative shift amount of C1[1]. As shown in the graph 1302, the cross-correlation value is maximum at a shift amount S1[1]. Accordingly, C1[1] is cyclically shifted from C1[0] by the shift amount S1[1].

On the other hand, in a first detection code 1311 illustrated in FIG. 13B, two correcting codewords are also included, and portions to be cyclically shifted C2[0] and C2[1] are included in the two correcting codewords, respectively. A graph illustrated on the lower side of FIG. 13B represents the cross-correlation value between the portions to be cyclically shifted C2[0] and C2[1]. In this graph, the horizontal axis represents the relative shift amount of C2[1] with respect to C2[0], and the vertical axis represents the cross-correlation value. A graph 1312 represents the cross-correlation value for each relative shift amount of C2[1]. As shown in the graph 1312, the cross-correlation value is maximum at a shift amount S2[1]. Accordingly, C2[1] is cyclically shifted from C2[0] by the shift amount S2[1].

Figure 14:
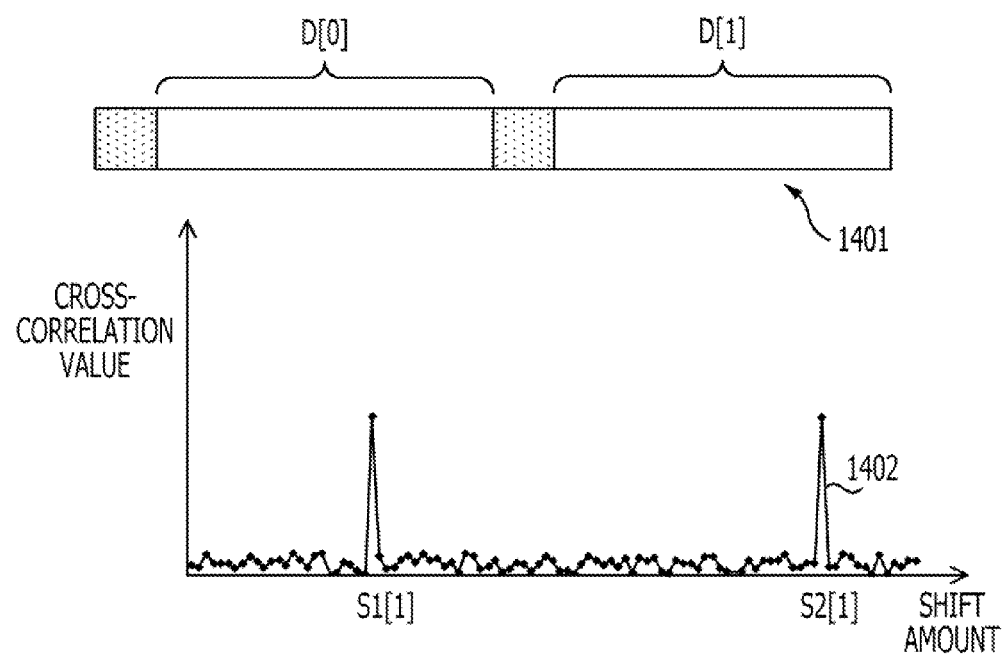
FIG. 14 illustrates the first detection code detected from the content that is obtained by combining two contents with the first detection codes illustrated in FIG. 13A and FIG. 13B embedded therein, and the cross-correlation value between two portions to be cyclically shifted included in that first detection code.

FIG. 14 illustrates a first detection code detected from the content that is obtained by combining two contents with the first detection codes illustrated in FIG. 13A and FIG. 13B embedded therein, and the cross-correlation value between two portions to be cyclically shifted included in the detected first detection code. The two contents are combined, for example, by averaging signals corresponding to each other between the two contents. In a first detection code 1401 illustrated in FIG. 14, two correcting codewords are included, and portions to be cyclically shifted D[0] and D[1] that have been modified by combining the contents are included in the correcting codewords, respectively. A graph illustrated on the lower side of FIG. 14 represents the cross-correlation value between the portions to be cyclically shifted D[0] and D[1]. In this graph, the horizontal axis represents the relative shift amount of D[1] with respect to D[0], and the vertical axis represents the cross-correlation value. A graph 1402 represents the cross-correlation value for each relative shift amount of D[1]. As shown in the graph 1402, the cross-correlation value has two maximum values. One of the two maximum values corresponds to the relative shift amount S1[1] of the portion to be cyclically shifted C1[1] with respect to the portion to be cyclically shifted C1[0], the portions to be cyclically shifted C1[1] and C1[0] being not modified. The other corresponds to the relative shift amount S2[1] of the portion to be cyclically shifted C2[1] with respect to the portion to be cyclically shifted C2[0], the portions to be cyclically shifted C2[1] and C2[0] being not modified. Accordingly, in a second detection code obtained by cyclically shifting D[1] by the shift amount S1[1] and then combining D[1] and D[0], digital watermark information included in C1[0] and C1[1] is emphasized. Therefore, the digital watermark detecting device can extract the digital watermark information included in C1[0] and C1[1] from the second detection code obtained by combining D[1] and D[0]. On the other hand, this cyclically shifting results in that bits corresponding to each other of the digital watermark information included in C2[0] and C2[1] are at different positions, and therefore the digital watermark information included in C2[0] and C2[1] by the cyclically shifting is randomized. For this reason, the digital watermark detecting device cannot extract digital watermark information included in C2[0] and C2[1] from the second detection code.

Likewise, in a second detection code obtained by cyclically shifting D[1] by the shift amount S2[1] and then combining D[1] and D[0], digital watermark information included in C2[0] and C2[1] is emphasized. For this reason, the digital watermark detecting device can extract digital watermark information included in C2[0] and C2[1] from the second detection code obtained by combining D[1] and D[0]. Thus, digital watermark information embedded using the digital watermark embedding device according to this embodiment has a resistance to collusion attacks.

As described above, the digital watermark embedding device according to this embodiment can reproduce digital watermark information included in correcting codewords even if a collusion attack is carried out using a plurality of contents in which different digital watermark information is embedded and that are the same. As a result, a resistance to collusion attacks is obtained. In this digital watermark embedding device, the bit length of a codeword embedded in the content needs only to be the longest from several times to several tens of times longer than the bit length of digital watermark information. In such a manner, the bit length of a codeword is restricted to a level at which no problem arises in practice. As a result, restrictions are also imposed on the amount of computation of the digital watermark embedding process and the amount of computation of the digital watermark detecting process.

According to a modification, the cyclic shift sequence detecting unit of the processing unit of the digital watermark detecting device may obtain the shift amount in each correcting codeword by directly detecting the shift amount detection code from the first detection code using pattern matching or the like.

According to another modification, the shifting unit of the processing unit of the digital watermark embedding device may divide the portion to be cyclically shifted of the base codeword in units of blocks having the same length as the shift amount detection code and perform scrambling of each block, instead of cyclically shifting the portion. The scrambling in this modification is processing of permutating the positions of blocks under a predetermined permutation rule. In this case, the shifting unit preferably performs scrambling such that, with respect to the position of a block including a shift amount detection code after scrambling, the order of other blocks is uniquely determined. The shifting unit performs scrambling of the portion to be cyclically shifted of the base codeword such that the position of the block including the shift amount detection code differs from one correcting codeword to another. Further, for each digital watermark information embedded in the content, the shifting unit differs the arrangement of blocks for each correcting codeword.

In this case, the cyclic shift sequence detecting unit of the processing unit of the digital watermark detecting device directly detects the shift amount detection code from the first detection code using pattern matching or the like. The cyclic shift sequence detecting unit specifies the order of permutating blocks in each portion to be cyclically shifted, referring to a reference table showing a relation between the position of the shift amount detection code and the permutation order for blocks. The reverse shifting unit reversely scrambles blocks of each portion to be cyclically shifted in the specified permutation order to restore the arrangement of blocks to its original state. The reference table is stored in advance in the storage unit of the digital watermark detecting device.

Next, a second embodiment will be described. A digital watermark embedding device according to the second embodiment determines a plurality of shift amounts for generating a plurality of correcting codewords to be embedded in one content, according to a specific random number sequence. The digital watermark embedding device according to the second embodiment differs in processing performed by a shifting unit of a processing unit from that according to the first embodiment. Hereinbelow, the processing of the shifting unit and the relevant items will be described. For other elements of the digital watermark embedding device, the reader will be referred to the descriptions of the corresponding elements of the digital watermark embedding device according to the first embodiment.

A storage unit of the digital watermark embedding device stores in advance a plurality of random number sequences R[0], R[1], . . . , R[L-1]. The random numbers included in each random number sequence are any integers from 0 to (M-1), where M is the bit length of the portion to be cyclically shifted. Further, L is an integer of 2 or more, and is set, for example, to an assumed value of the maximum number of users to which the same content is distributed. The random number sequence needs only to be created by any of various random number generation methods and pseudo-random number generation methods such as Linear congruential generators, Mersenne twister, or a random number generation method using AES encryption. Each random number sequence is obtained by extracting, from a base random number sequence generated using the common random number generation method and the common seed, random numbers that continue by the largest number of correcting codewords included in one content from the top positions differing from one another. The base random number sequence is preferably generated such that a periodic portion is not included in each of random number sequences R[0], R[1], . . . , R[L-1]. For example, in the case where the base random number sequence is generated using a Linear congruential generator, the base random number sequence may be generated using such parameters that the period of the generated random number sequence is longer than a value obtained by multiplying L by the largest number of correcting codewords. Each of the random number sequences R[0], R[1], ..., R[L-1] may be selected so as to be overlapped with part of the base random number sequence. For example, each of random number sequences R[0], R[1], ..., R[L-1] may be a set of a plurality of random numbers starting at i-th, (i+1)-th, ..., (i+L-1)-th random numbers of the base random number sequence, respectively.

The shifting unit of the processing unit of the digital watermark embedding device selects any random number sequence R[k] (0≤k≤L-1) of the stored random number sequences, every time digital watermark information is embedded in the content. The shifting unit determines the shift amounts of the portions to be cyclically shifted included in correcting codewords in accordance with the order of random numbers included in the selected random number sequence R[k]. For example, the shifting unit selects random number sequences R[k] that differ from one digital watermark information to another. Then, the shifting unit determines that the shift amount of the n-th (where n is an integer of 1 or more) correcting codeword is the n-th random number [k][(n-1)] of the random number sequence R[k]. This determination of the shift amount is performed as processing in operation S103 in the flowchart of the digital watermark embedding process illustrated in FIG. 8.

The shifting unit cyclically shifts the portion to be cyclically shifted of the base codeword using a plurality of shift amounts determined in such a way according to any random number sequence, thereby generating a plurality of correcting codewords. The digital watermark embedding device according to this embodiment embeds the plurality of correcting codewords in the content.

On the other hand, the digital watermark detecting device according to the second embodiment extracts digital watermark information from the content in which the digital watermark information has been embedded by the digital watermark embedding device according to the second embodiment. The digital watermark detecting device according to the second embodiment differs in processing performed by the cyclic shift sequence detecting unit from the digital watermark detecting device according to the first embodiment. Hereinbelow, the cyclic shift sequence detecting unit will be described. In this embodiment, the shift amounts applied to correcting codewords are determined according to any of a plurality of random number sequences that are prepared in advance, and therefore the cyclic shift sequence detecting unit needs only to determine the most likely one from among the plurality of random number sequences. The cyclic shift sequence detecting unit therefore calculates a goodness of fit representing the likelihood of each of the random number sequences by the following equation.

$$v[j] = \sum_{k=0}^{M-1} \left| \sum_{l=1}^{N-1} C[0]([k - R[j][0]) \% M]C[1][(k - R[j][1]) \% M] \right| \quad (3)$$

where C[i][k] denotes the value corresponding to a k-th bit of the portion to be cyclically shifted in an i-th correcting codeword in the first detection code, as in Equation (2). Here, i takes values from 0 to (N-1) so that the top correcting codeword is included. Further, R[j][l] denotes an l-th random number of a random number sequence R[j]; M is the code length of the portion to be cyclically shifted; N denotes the number of correcting codewords included in the first detection code, that is, the number of position detection codes detected in the first detection code; and v[j] denotes the goodness of fit of the random number sequence R[j]. The goodness of fit obtained by Equation (3) represents the sum of cross-correlation values between one of correcting codewords in the case where a plurality of correcting codewords are permutated so as to cancel a plurality of shift amounts in accordance with the random number sequence of interest, and other correcting codewords. The cyclic shift sequence detecting unit obtains a goodness of fit v[j] while changing j, and specifies a random number sequence R[jmax] whose goodness of fit v[j] is maximum. Then, the cyclic shift sequence detecting unit determines that an l-th random number of the random number sequence R[jmax] is the shift amount for the l-th portion to be cyclically shifted included in the first detection code. This determination of the shift amount is performed as processing in operation S203 in the flowchart of the digital watermark detecting process illustrated in FIG. 12.

In this embodiment, the number of combinations of shift amounts used for generating correcting codewords may be limited to the number of random number sequences that is prepared in advance. Therefore, in order to obtain the combination of shift amounts used for generating correcting codewords, the digital watermark detecting device needs only to calculate the goodness of fit the number of which is equal to the number of sets of random number sequences. Consequently, in this embodiment, the amount of computation for obtaining the combination of shift amounts used for generating correcting codewords can be reduced by the amount more than the amount of computation by the digital watermark detecting device according to the first embodiment.

The digital watermark embedding device according to any of the foregoing embodiments may be incorporated into a set-top box, a server, or a personal computer, for example. A device in which the digital watermark embedding device is incorporated performs the foregoing digital watermark embedding process on, for example, moving image data that is the content received through a communication network or an antenna when reproducing the moving image data. In the case where the moving image data is compressed by a predetermined compression method, the device decodes images included in the moving image data by the predetermined compression method. Then, the device stores the images included in the moving image data in chronological order in a buffer memory that the device includes. The device then reads images in chronological order from the buffer memory and performs the digital watermark embedding process to cause images with digital watermark information embedded therein to be displayed on a display.

Further, a computer program that causes a computer to implement functions that the processing unit of the digital watermark embedding device according to any of the foregoing embodiments has may be provided in the form in which the computer program is recorded in a computer-readable recording medium. Likewise, a computer program that causes a computer to implement functions that the processing unit of the digital watermark detecting device according to any of the foregoing embodiments has may be provided in the form in which the computer program is recorded in a computer-readable medium. However, the computer-readable medium does not include a transitory medium such as a propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital watermark embedding device including an interface configured to acquire content in a digital form and digital watermark information, the device comprising:
    a memory configured to store a plurality of instructions; and
    a processor configured to execute the instructions, the instructions comprising,
    a codeword generating instruction configured to generate a base codeword including a bit sequence including the digital watermark information;
    a shifting instruction configured to generate a plurality of correcting codewords differing from one another by permutating an arrangement in the bit sequence included in the base codeword depending on a plurality of shift amounts, the plurality of shift amounts differing from one digital watermark information to another, under a predetermined permutation rule; and
    a watermark superimposing instruction configured to embed the plurality of correcting codewords in the content, wherein
    the codeword generating instruction generates the base codeword by adding a position detection code, the position detection code being used for specifying positions of the plurality of correcting codewords in the content, and a shift amount detection code, the shift amount detection code being used for specifying the shift amounts corresponding to the plurality of correcting codewords, to the digital watermark information.

2. The device according to claim 1,
    wherein the predetermined permutation rule is cyclically shifting; and
    wherein the shifting instruction determines the plurality of shift amounts according to a plurality of random numbers obtained every time the digital watermark information is embedded in the content.

3. The device according to claim 2,
    wherein the shifting instruction selects any of a plurality of random number sequences differing from one another every time the digital watermark information is embedded in the content, and determines the plurality of shift amounts using a plurality of random numbers belonging to the selected random number sequence.

4. The device according to claim 1,
    wherein the arrangement in the bit sequence includes the digital watermark information and the shift amount detection code.

5. A non-transitory computer-readable recording medium storing a digital watermark embedding program that causes a computer to embed digital watermark information in content in a digital form, the digital watermark embedding program causing the computer to execute a process comprising:
    generating a base codeword including a bit sequence including the digital watermark information;
    generating a plurality of correcting codewords differing from one another by permutating an arrangement in the bit sequence included in the base codeword depending on a plurality of shift amounts, the plurality of shift amounts differing from one digital watermark information to another, under a predetermined permutation rule; and
    embedding the plurality of correcting codewords in the content, wherein,
    in the generating of the base codeword, the base codeword is generated by adding a position detection code, the position detection code being used for specifying positions of the plurality of correcting codewords in the content, and a shift amount detection code, the shift amount detection code being used for specifying the shift amounts corresponding to the plurality of correcting codewords, to the digital watermark information.

6. The non-transitory computer-readable recording medium according to claim 5,
    wherein the predetermined permutation rule is cyclically shifting; and
    wherein in the generating of the plurality of correcting codewords differing from one another, the plurality of shift amounts are determined in accordance with a plurality of random numbers obtained every time the digital watermark information is embedded in the content.

7. The non-transitory computer-readable recording medium according to claim 6,
    wherein, in the generating of the plurality of correcting codewords differing from one another, any of a plurality of random number sequences differing from one another are selected every time the digital watermark information is embedded in the content, and the plurality of shift amounts are determined using a plurality of random numbers belonging to the selected random number sequence.

* * * * *